E. FULDA.
ATTACHMENT FOR ELECTRIC WELDING MACHINES.
APPLICATION FILED AUG. 6, 1913.

1,168,385.

Patented Jan. 18, 1916.

WITNESSES
F. B. Townsend
James Phelan

INVENTOR
Edward Fulda
BY
Townsend & Dickes
ATTORNEYS

UNITED STATES PATENT OFFICE.

EDWARD FULDA, OF NEW YORK, N. Y.

ATTACHMENT FOR ELECTRIC WELDING-MACHINES.

1,168,385.   Specification of Letters Patent.   Patented Jan. 18, 1916.

Application filed August 6, 1913. Serial No. 733,241.

*To all whom it may concern:*

Be it known that I, EDWARD FULDA, a citizen of the United States, and a resident of New York, in the county of New York and State of New York, have invented certain new and useful Improvements in Attachments for Electric Welding-Machines, of which the following is a specification.

My invention relates to an attachment for electrode welding machines whereby the said machine is adapted for use in welding the flange of one piece of metal to the face of another piece in addition to use for the ordinary classes of work in which two plain pieces or sheets of metal are inserted between the welding jaws.

The invention relates more particularly to an attachment suited for use with that class of electrode welders in which the two electrodes or terminals are supported respectively in heads at the extremities of arms or horns arranged to form a gap for insertion of the work.

My invention consists essentially of an auxiliary or supplemental arm adapted to be supported by a hinge or pivot on the head of the machine carrying one electrode and provided at its other end with an electrode adapted to coöperate with an electrode on the opposite head of the machine by a lateral movement on a line transverse to the line of movement of the electrode employed in the normal operation of the machine as hereinafter described and shown in the accompanying drawings.

Figure 2:
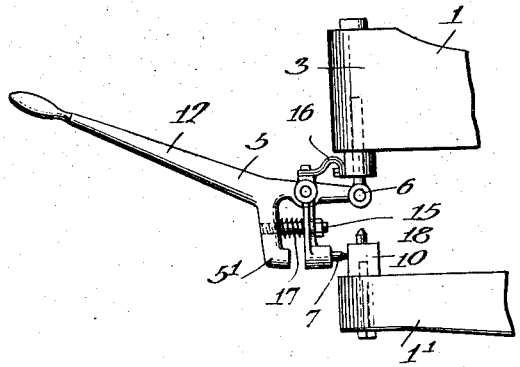
Figure 1:
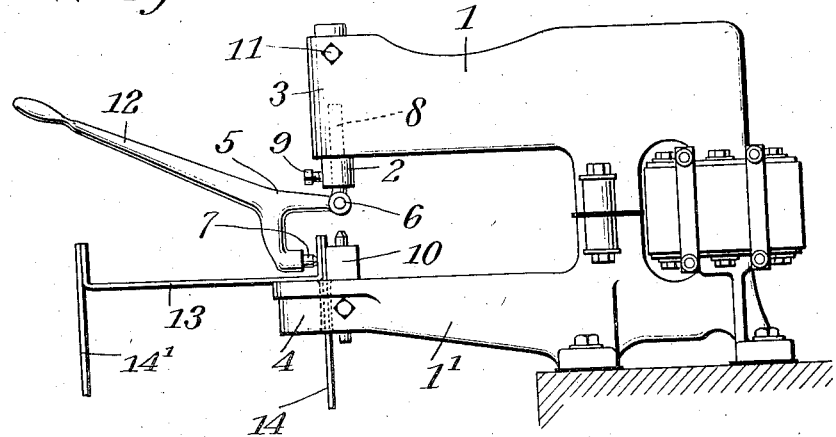
Figure 3:
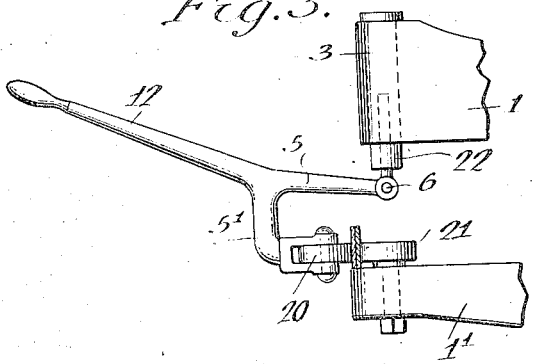

In the accompanying drawings, Figure 1 is a general side elevation of an electrode welding machine showing my improved attachment in accordance with one of its forms. Fig. 2 is a similar view showing a modification. Fig. 3 illustrates a further modification.

1 is the upper arm or horn of the machine and 1' the lower arm or horn. The extremities or heads of these arms are adapted to carry respectively the upper and lower electrodes employed and operated in the usual manner to form a spot weld between two sheets or plates of metal inserted in the gap between the horns.

2 indicates the usual electrode-carrying slide working in the upper head 3 and operated by any usual mechanism, as well understood in the art, such mechanism not being herein shown for the sake of simplicity. The lower head 4 is furnished with the usual or any proper means for supporting the electrode with which the upper electrode coöperates in the ordinary manner to form a weld, when the upper electrode is forced down toward the lower by the operation of the upper electrode-carrying slide 2 to compress the work and furnish the heating electric current.

Referring particularly to Fig. 1, 5 indicates the auxiliary arm of my invention. Said arm is preferably made as a bent arm, as shown, but may be of other conformation without departing from my invention. One end of said arm, as at 6, is adapted to be pivoted or hinged in one head of the machine, as for instance the upper head, while its opposite end carries a welding electrode 7 adapted to coöperate with an electrode 10 supported on the opposite head 4. For the purpose of supporting the arm 5 on the head 3, the pivotal end thereof may be furnished with a holder 8 adapted to be substituted in the electrode-carrying slide 2 for the pin electrode of usual form and to be held in place therein by the usual clamping screw 9 or other suitable means, and as shown.

In addition, if desired, a clamping screw or other device 11 may be employed to clamp the slide 2 when the attachment 5 is in use. In some cases, however, it may be desirable to leave the slide 2 free to move up and down, as this will aid in bringing the electrode 7 into proper engagement with the work. Electrode 10 may be a special electrode adapted to be substituted for the usual pin-shaped electrode employed on the lower head 4 or, as will be obvious, the side of the lower electrode may be properly shaped or conformed for coöperation with the electrode 7 in doing any special work for which the machine is adapted by the employment of my improved attachment. The arm or lever 5 may be furnished with a handle 12 or other means for operating it.

Fig. 1 illustrates the use of my improved attachment in welding the flange or upturned edge of the piece 13 to the face of a sheet of metal 14 held in upright position against the side of electrode 10 and in a suitable space cut away in the side of the head 4. The special work shown is a pair of sheet metal plates 14, 14' and a channel-shaped piece 13 to be welded in place between them, the pieces comprising the parts of a sheet metal door or other object in which the pieces 14, 14' form the face plates or sides and the piece 13 the edge.

Clearly, my invention might be employed in the welding of other constructions, as for instance the welding of a depressed head furnished with upturned edges, into the ends of a sheet metal cylinder.

In the operation of the attachment it is obvious that by leaving the usual tool-carrying slide 2 free to move up and down, the insertion of the electrode 7 into the space within the channel-shaped piece will be facilitated although, as before stated, the parts may be secured in position in the upper head, so that the pivotal end of the attachment 5 will swing on a fixed support.

As above stated and as indicated in the drawing, the forward end of the lower arm 4 may be provided with a sidewise groove, so that the piece 14 may be inserted sidewise into this arm to bring it into contact with the lower electrode 10. By this construction the forwardly extending ledge of the arm provides a seat or support for the part 13 or other part to be welded. If desired, however, the end 4 of the lower arm may terminate at or about the forward surface of the lower electrode 10, whereby clear space is left for manipulation of the work as indicated in Fig. 2.

Referring to Fig. 2, a modification in the manner of applying the welding pressure to the work between the electrodes is illustrated. In this construction the arm 5 carries an auxiliary arm 15 loosely pivoted thereto and which latter arm is provided with the work-engaging electrode 7 of any desired character. A flexible connection 16 conducts the current direct from the head 3 to the electrode arm 15. Between the rigid arm 5' of the attachment 5 and the arm 15 is a coil spring 17, the stud 18 of which is connected rigidly to the arm 5' and passes loosely through the arm 15. In operation a light pressure is first applied to the work through the spring 17 which pressure increases as the spring is further compressed due to the downward movement of arm 5 until finally a heavy solid pressure is applied by a direct contact between the end of the arm 5' and the back of the arm 15. If desired any other resilient device may be substituted for the spring 17 and its location between the arms 5' and 15 may be varied.

As shown in Fig. 3, the work-engaging contact carried by the arm 5 may be in the form of a roller 20 mounted to rotate in the end of the arm 5', whereby a continuous seam weld may be attained in the work operated upon. If desired the other electrode or contact may also be in the form of a roller 21 and may either rotate loosely or by gears to cause the work to travel. Also, if desired, the arm 5 may swing horizontally about the electrode contact 21 by providing a swivel connection between the head 3 and plunger or post 22.

What I claim as my invention is:—

1. An attachment for electrode welding machines, comprising a pivoted arm pivotally supported at one end on one head of the machine and provided at its opposite end with an electrode adapted to coöperate with an electrode on the opposite head of the machine by a lateral movement on a line transverse to the vertical.

2. An attachment for electrode welding machines, comprising a bent arm hinged at one end on a support adapted to be inserted in a work-holding slide mounted on one head of the machine and provided at its opposite end with an electrode adapted to coöperate by a lateral movement with an electrode carried by the opposite head of the machine.

3. An attachment for electrode welding machines, comprising a bent arm adapted to be pivotally supported on one head of the machine and carrying at its opposite end an electrode adapted to engage the work by movement transverse to the vertical.

4. An attachment for electrode welding machines, comprising a bent arm adapted to be pivotally supported on one head of the machine and provided at its other end with a roller electrode adapted to engage the work by a movement of the end of said arm carrying said roller electrode in a direction transverse to the vertical.

5. An attachment for electrode welding machines, comprising a bent arm adapted to be pivotally supported on one head of the machine and provided at its other end with a roller electrode mounted to turn in a plane transverse to the vertical, and said arm being adapted to swing to carry the electrode bodily in a line transverse to said line of normal operation.

6. An attachment for electrode welding machines, comprising an arm pivotally supported on one head of the machine, a contact-carrying arm pivoted to said first-named arm and adapted to advance toward an electrode supported on the opposite head of the machine by a lateral movement and a varying pressure device between said arms.

7. In an electrode welding machine, an electrode carrying arm provided with an electrode pivotally supported thereon combined with an intermediate spring through which pressure is applied from the arm to said electrode.

8. In an electrode welding machine, a head and a horizontally disposed contact member pivotally connected with said head and adapted to horizontally engage the work and apply welding pressure thereto.

9. In an electrode welding machine, an arm, a slidable member mounted in the end of said arm and a horizontally disposed contact member pivotally connected with said slidable member and adapted to horizontally engage the work and apply welding pressure thereto.

Signed at New York, in the county of New York, and State of New York this 5th day of August A. D. 1913.

EDWARD FULDA.

Witnesses:
H. C. TOWNSEND,
F. B. TOWNSEND.